United States Patent
Ostrovskiy et al.

(10) Patent No.: US 9,497,478 B2
(45) Date of Patent: Nov. 15, 2016

(54) PREDICTIVE VALUE DATA SET COMPRESSION

(71) Applicant: HERE Global B.V., Veldhoven (NL)

(72) Inventors: Roman Ostrovskiy, Prospect Heights, IL (US); Xin Chen, Evanston, IL (US)

(73) Assignee: HERE Global B.V., Eindhoven (NL)

( * ) Notice: Subject to any disclaimer, the term of this patent is extended or adjusted under 35 U.S.C. 154(b) by 127 days.

(21) Appl. No.: 14/282,138

(22) Filed: May 20, 2014

(65) Prior Publication Data
US 2015/0341653 A1 Nov. 26, 2015

(51) Int. Cl.
| H04N 19/50 | (2014.01) |
| H04N 19/136 | (2014.01) |
| G06K 9/52 | (2006.01) |
| G06T 7/00 | (2006.01) |
| H04N 19/597 | (2014.01) |
| H04N 19/593 | (2014.01) |

(52) U.S. Cl.
CPC ............... *H04N 19/50* (2014.11); *G06K 9/52* (2013.01); *H04N 19/136* (2014.11); *H04N 19/593* (2014.11); *H04N 19/597* (2014.11)

(58) Field of Classification Search
CPC .. H04N 19/50; H04N 19/136; H04N 19/597; H04N 13/0048; H04N 19/593; H04N 19/61; H04N 13/0022; H04N 19/11; G06T 7/0051; G06T 2207/10028; G06K 9/52
See application file for complete search history.

(56) References Cited

U.S. PATENT DOCUMENTS

| 8,315,459 | B2 | 11/2012 | Nishikawa et al. | |
| 8,559,741 | B2 | 10/2013 | Chan et al. | |
| 8,615,140 | B2 | 12/2013 | Tin | |
| 2010/0220783 | A1* | 9/2010 | Mallat | H04N 19/00775 375/240.03 |
| 2013/0022111 | A1* | 1/2013 | Chen | H04N 19/50 375/240.12 |
| 2014/0055560 | A1* | 2/2014 | Fu | H04N 13/0022 348/42 |

* cited by examiner

*Primary Examiner* — Kim Vu
*Assistant Examiner* — Michael Vanchy, Jr.
(74) *Attorney, Agent, or Firm* — Lempia Summerfield Katz LLC

(57) ABSTRACT

A data set may be compressed by predicting a value for the values of the data set. A comparative value may then be determined between a predicted value and an actual value for the particular points of the data set. The comparators for the particular points of the data set may then be encoded.

14 Claims, 6 Drawing Sheets

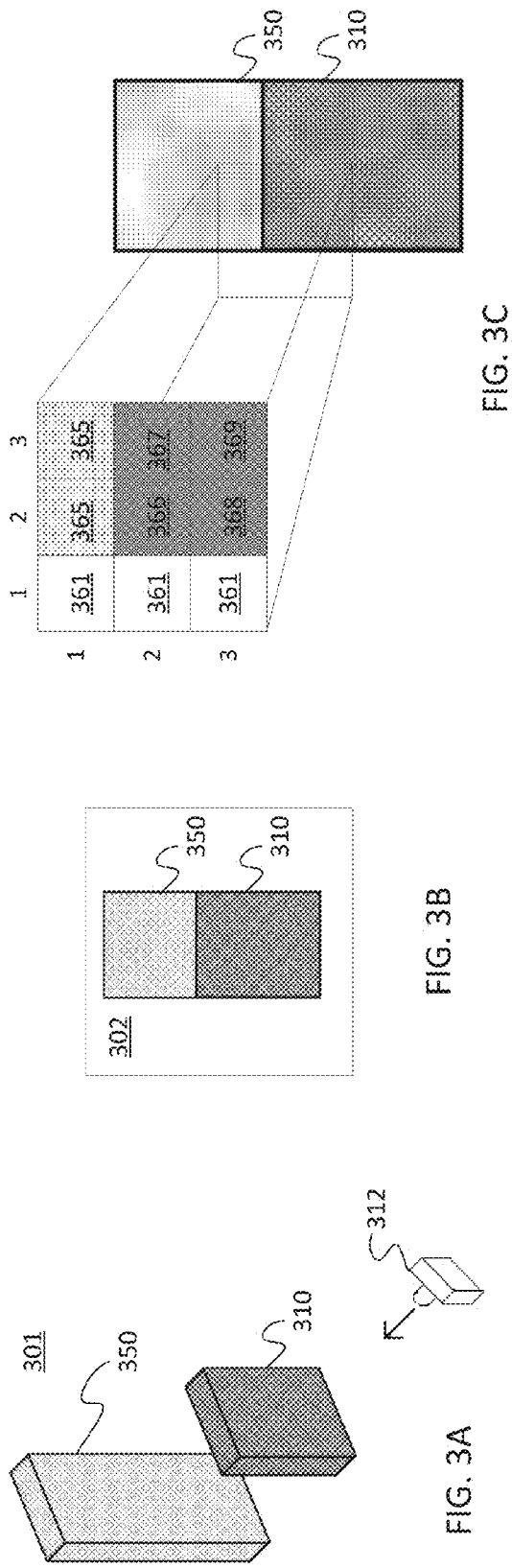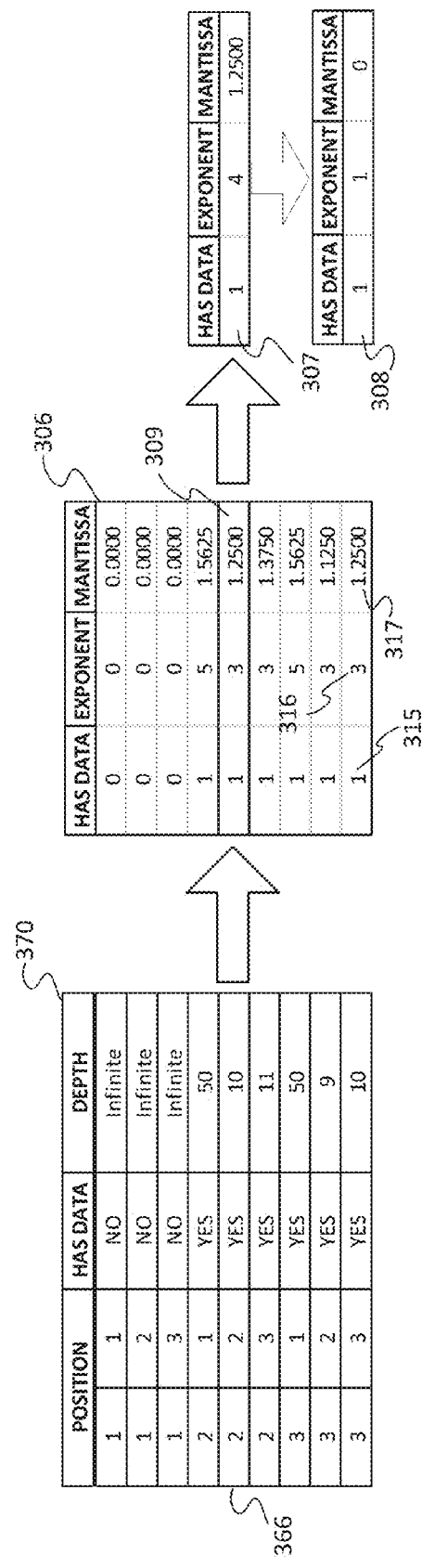
FIG. 3A
FIG. 3B
FIG. 3C
FIG. 3D

PREDICTIVE VALUE DATA SET COMPRESSION

FIELD

The following disclosure relates to data compression, and more specifically to floating point data set compression.

BACKGROUND

Mobile device users are provided with significant amounts of data. Some of this data may involve image data of geographic areas. The image data may involve data describing the physical nature of the image as well as information related to things depicted in the image. Further, mobile device users may desire the availability of data such that the data may be accessible quickly after a request. Issues may occur, however, as mobile devices may involve limited data storage capacities as well as limited communicative bandwidth to transfer data. Therefore, loading and presenting significant amounts of image data to a mobile device user may not be possible without lengthy data download delays.

SUMMARY

In an embodiment, a method involves identifying a data set comprising depth values for a plurality of points in an image. The method may also involve predicting a depth value for a particular point of the image based on depth values of neighboring points. The method may also involve determining a comparative value between the predicted depth value and an actual depth value for the particular point, and encoding the comparative value.

In an embodiment, an apparatus may involve at least one processor and at least one memory including computer program code and operable to store a data set comprising values for a plurality of pixels in an image, the values relating to relative distances of objects represented in the image. The at least one memory and the computer program code may be configured to, with the at least one processor, cause the apparatus at least to calculate a predicted value for a particular point of the image based on values of neighboring points, determine a comparator between the predicted value and an actual value for the particular point, and encode the comparator for the particular point.

In an embodiment, a non-transitory computer readable medium including instructions that when executed on a computer are operable to identify a data set comprising values associated with individual pixels of a plurality of pixels in an image. The instructions may be further operable to calculate a predicted value for a particular pixel of the image based on values of neighboring pixels. The instructions may be further operable to determine a comparator between the predicted value and an actual value for the particular pixel, and encode the comparator for the particular pixel.

BRIEF DESCRIPTION OF THE DRAWINGS

Exemplary embodiments of the present invention are described herein with reference to the following drawings.

FIGS. 3A-D illustrate an exemplary photo depth map predictive data set compression

DETAILED DESCRIPTION

Figure 1:
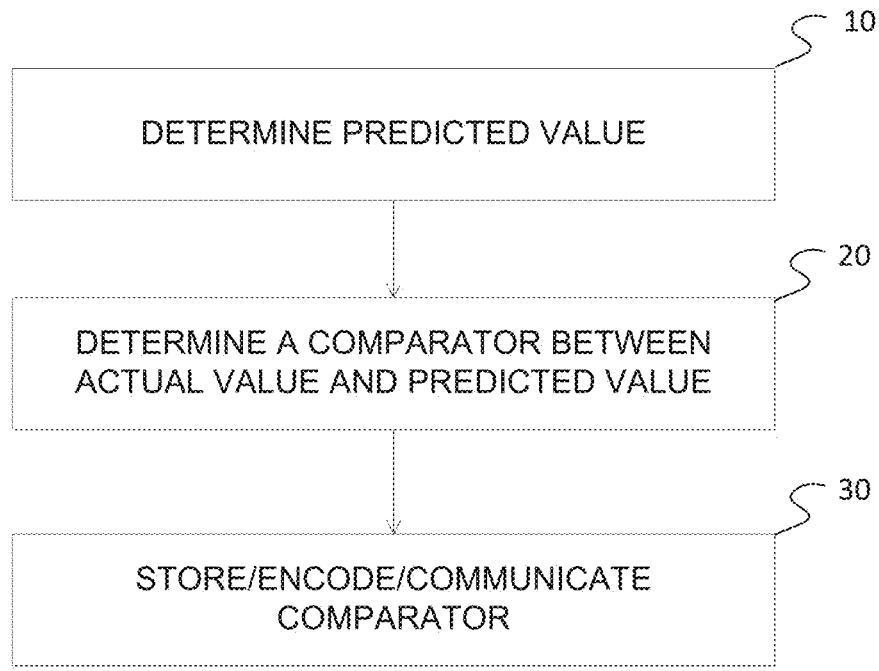
FIG. 1 illustrates a flow chart of an example embodiment for predictive value data set compression.

Image data may be provided to mobile device users to provide more detail and information relating to the objects in an image. Some of the image data may be data related to the distance of objects from an origin of an image. In particular, depth dimensions or distances to objects, such as distances along a Z-axis perpendicular to the plane of the image, may be provided in a depth map. A depth map may involve a value for a depth distance of an object represented by each pixel or point of an image. As such, a depth map may be a collection of numbers in a data set for each pixel indicative of a depth of the object represented by particular pixel. A depth map may also include data indicative of the position or placement of a pixel in the image, as well as other data providing description of the relative physical placement of the individual pixels, or the object the pixels represent. Data acquisition techniques, such as photogrammetry methods or Light Detection and Ranging (LIDAR), may be used to develop depth maps correlated to images. In an embodiment, such as full field of view or 360 degree imaging, a depth map may be created as a map of radial distances to the center of a camera or origin of an image. Depth maps may be used to enhance the interaction of a mobile device user with images of geographic areas. For example, relative distances between objects of an image may be determined using the depth map data, and used to provide additional information related to the geographic area to a user so as to create an immersive data driven experience and environment.

The depth map collection of data, or data set, may be transmitted or otherwise communicated between a server and a mobile device as indicated below with respect to FIGS. 4-6. A depth map data set for an image is transferred quickly and efficiently to a mobile device because the depth map data set may be compressed so as to allow the same information to be communicated to the mobile device, using less actual data in a transfer. In this way, data may be provided for images in a fast and bandwidth reduced manner.

A data set of numbers may be compressed by analyzing the original data set and determining a predictable value for the numbers in the data set and also determining a comparator or comparative value between the actual value and the predictable value for the numbers in the data set. The comparator may be stored or communicated in place of the actual values or numbers. Numbers that are predicted correctly only require minimal representative data to be stored, encoded, and/or communicated as the value may be predicted without the transmit of data specific to that number. In an embodiment, no data will need to be stored as representative of the number value. In this way, smaller amounts of data may be used to communicate the total amount of information provided by the data set.

In some data sets, such as depth maps, there is a local similarity of data. For example, points in an image may represent the same object, and as such may have similar depth values. This local similarity of data may be used as the predictor of the value for neighboring points sharing the locality.

Depth maps may be stored using numbers of any format. In an embodiment, the numbers may be stored as floating point data having separate values stored for a mantissa and an exponent of the numbers. Floating point data compression may involve lowering the precision of floating point number representation. For example, a smaller number than the standard number of bits may be selected to store a mantissa and an exponent of a number. A predictive value compression technique may then be used to reduce the amount of data. The predictive value compression technique may also take advantage of the local similarity of data in depth maps by recognizing that this similarity may primarily manifest itself in a magnitude component of the number such as the exponent. Therefore, points having similar exponent values may be used to predict mantissa values.

FIG. 1 illustrates a flow chart of an example embodiment of predictive data set compression. As presented in the following sections, the acts may be performed using any combination of the components indicated in FIG. 4, FIG. 5, or FIG. 6. For example the term controller may refer to either controller 200 of or processor 300 and the following acts may be performed by mobile device 122, server 125, or a combination thereof. Additional, different, or fewer acts may be provided. The acts are performed in the order shown or other orders. The acts may also be repeated.

In act 10, a value for a particular number of a data set involving multiple numbers may be predicted. The data set may be identified from other data stored on a disk or memory, or received through a communicative transmission or other means. The data set may involve depth values corresponding to points or pixels of an image, and as such be considered a depth map of the image. The image may be of a geographic area, and the depth values may correspond to objects appearing in the image of the geographic area. The depth map may measure depth values from a perspective of an origin of an image such that the depth values for each point are respective of a same origin, and thus relative to each other. The depth values may be distance values from the origin, measured in any units. For example, the depth values may be measured in inches, feet, millimeters, meters, or any other unit of measure capable of indicating relative distance.

The value for the particular number may be predicted using any technique. In an embodiment, such as an embodiment involving a depth map, local similarities of data may be used to predict a value for the particular number. For example, an average of neighboring point values may be used as a predicted value. Further, an average of neighboring points having values of a similar magnitude to an actual value for the particular point may be used to determine a predicted value for the particular point.

In act 20, a comparator may be determined between an actual value for a particular point and the predicted value for the particular point determined in act 10. The comparator may be any value or representation that indicates a comparative similarity between the actual value and the predicted value. As such, a comparator exists such that if any two of the actual value, predicted value, or comparator are known, then the third may be determined. The comparator is associated with the same point of the image as the predicted and actual value, and in this way represents data of the point in the image. In an embodiment, the comparator may be a value indicative of the difference between the actual value and the predicted value. In an embodiment, the comparator may be a multiplier or relative factor between the actual value and the predicted value.

In act 30, the comparator is processed so as to store, encode, and/or communicate the comparator. For example, the comparator may be processed through an encoding algorithm. Any encoding algorithm may be used. For example, an arithmetic encoding algorithm may be used. The encoding algorithm may further reduce the amount of data required to transmit or communicate the information of the image. Further, multiple comparators associated with multiple points of the image may be encoded. In an embodiment, all of the points of an image having associated values may have values predicted and comparators determined.

In an embodiment, the encoded comparator may be communicated to a user. For example, the encoded comparator may be communicated from the server 125 to the mobile device 122 as indicated with respect to FIG. 4. The encoded comparator may be communicated in a data stream communication involving other encoded values from the data set, as well as other image related data, so as to provide a user an enhanced image based experience. For example, relative distances between points of the image may be provided to the user. As such, enhanced image data may be provided to a mobile device user in an efficient and timely manner.

A mobile device may receive the encoded comparator. In an embodiment, the mobile device may be configured to decode the comparator. The mobile device may be further configured to predict a value, such as the depth value, for the point associated with the comparator using the same predictive technique as was used to determine the comparator in act 10. The mobile device may then determine the actual value for the point using the comparator and the predicted value.

Figure 2:
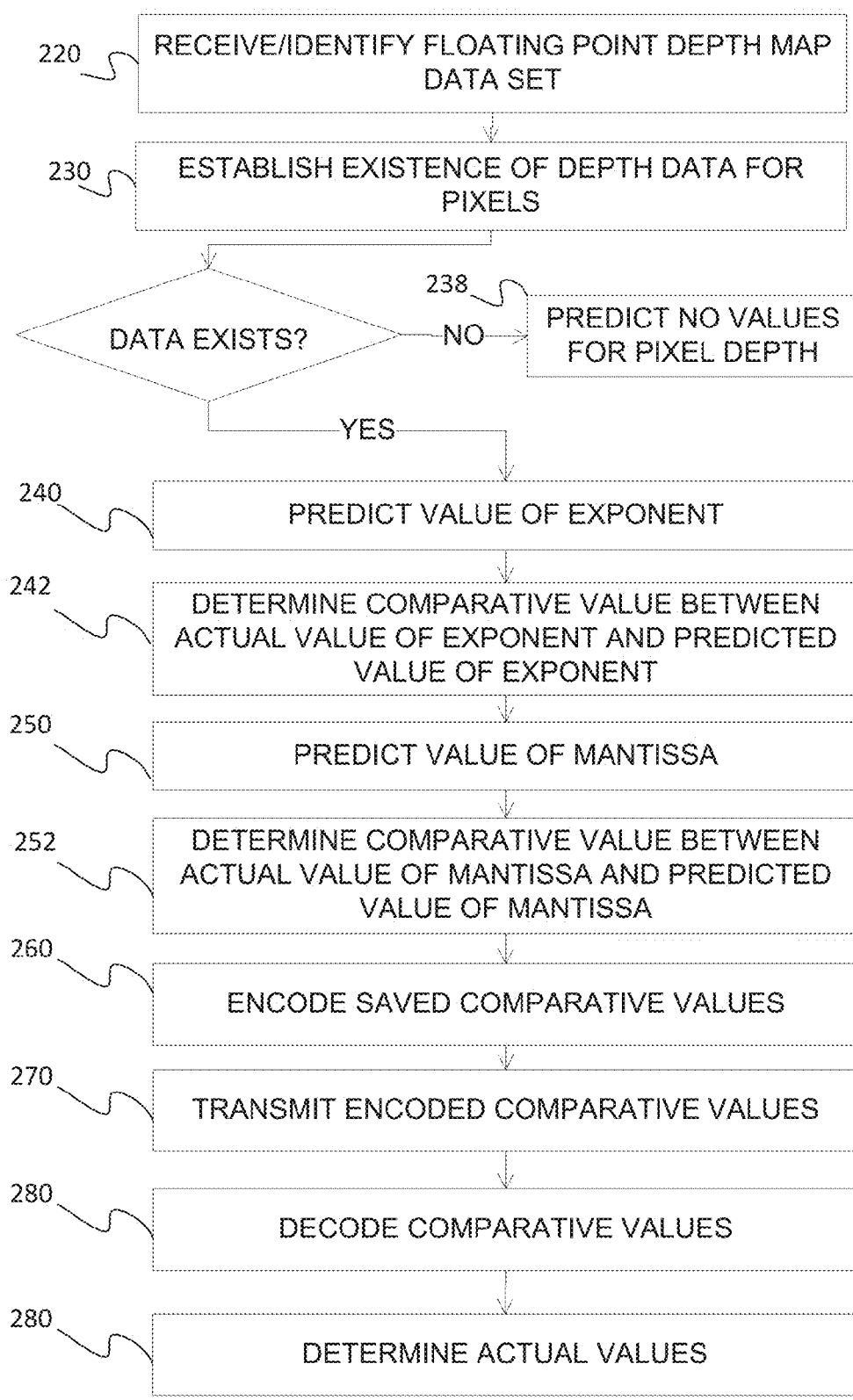
FIG. 2 illustrates another flow chart of an example embodiment for predictive value data set compression.

FIG. 2 illustrates an example embodiment for predictive value data set compression involving floating point numbers. As presented in the following sections, the acts may be performed using any combination of the components indicated in FIG. 4, FIG. 5, or FIG. 6. For example the term controller may refer to either controller 200 of or processor 300 and the following acts may be performed by mobile device 122, server 125, or a combination thereof. Additional, different, or fewer acts may be provided. The acts are performed in the order shown or other orders. The acts may also be repeated.

In act 220, a data set may be identified. The data set may be an image depth map data set having numbers represented in floating point format. The depth values for the points of the image may be stored in any order, for example, the depth values may be stored in Z-Order for the pixels or points of the image. The depth values may be relative distances of objects represented by the pixels of the image. Numbers represented in floating point format are represented with a fixed number of significant digits (i.e. significand or mantissa) and scaled using an exponent. Any exponent base may be used. For example, bases of 2, 10 or 16 may be used. Further, any standard or non-standard floating point format representation may be used. For example, the Institute of Electrical and Electronics Engineers Standard for Floating Point Arithmetic (IEEE 754) may be used. Further, the IEE 754 standard may use any level of precision in representation of numbers. For example, standard values for bit storage of the mantissa and exponent may be used as associated with the Minifloat, Half, Single, Double, or Quadruple standard formats, as well as any other format. In an embodiment, the mantissa is stored in the data set using five (5) bits and the exponent is stored using three (3) bits.

The data set may also involve other data. In act 230 this other data may be used to establish the existence of depth data for each pixel or point of the image. In an embodiment, a single bit may be used for each pixel or point to indicate whether there is depth value for the pixel or point. For example, the bit value for each point in the dataset may be set to one (1) if there is depth data, and zero (0) if there is no depth data.

In an embodiment, if no depth data is established for a pixel, no values are predicted for that particular pixel in act 238. However, if data is determined to exist, predicted values may be determined. In an embodiment involving depth map data for a geographic area, infinite depth areas such as sky or horizon pixels may have no depth data associated. Including the depth value indicator then facilitates a reduction in the processing required. In an embodiment involving floating point number representation the mantissa and exponent may be predicted separately. Values may be predicted for each pixel in an image having data. Further, the data for pixels may be processed sequentially to determine predicted values such that previously processed values may be the values used for predicting a subsequent value. Further, in an embodiment involving local similarities of data, neighboring point values that have been processed may be used to determine predicted values. For example, a particular pixel may only use data from immediately adjacent points or pixels that have been processed to predict values for the particular point. As such, organizing the dataset in a manner facilitating the processing of geometrically neighboring points sequentially may allow for more available predicting data, and subsequently a more accurate prediction. It will be noted, that early in the prediction processing, there may be little or no values to use for prediction, and as such general or average values may be used in the absence of enough data to perform a prediction. For example, if an average depth value for depth data is determined to be four (4), this value may be used in the absence of enough data. The general value may be determined prior to or after the commencement of the processing of the data set.

In act 240 the value of the exponent may be predicted. The exponent may be predicted by any technique. In an embodiment, the exponent may be predicted as an average or weighted sum of exponent values of neighboring pixels. Also, in a sequential processing embodiment, the exponent may be predicted as an average or weighted sum of neighboring pixels having already been processed.

In act 242 a comparative value between the actual value of the exponent and the predicted value of the exponent may be determined. The comparative value may be determined using any method. The comparative value may be determined such that the closer the predicted value is to the actual value, the smaller the amount of data is required for storing the comparative value. For example, if the predicted value matches the actual value the comparative value may be zero (0). For example, the comparative value may be determined as the absolute difference between the actual value and the determined value.

In an embodiment the comparative value may be determined for a pixel using a predicted value P for the pixel. The comparative value C may be determined such that whenever the predicted value P is closer to an actual value R, the value of C becomes smaller using the following technique. For a number represented with N bits the value of C may be determined as follows:

```
Input: P and R integer numbers in range [0, 2^N - 1]
Output: C integer number in range [0, 2^N - 1]
let M := 2^N - 1
if P < 2^(N-1) then
    let p := P
    let r := R
else
    let p:= M - P
    let r:= M - R
endif
if p > r then
    let C := 2*(p-r) - 1
else
    let d := r - p;
    if d > p then
        let C := r
    else
        let C := 2*d
    endif
endif
```

If the value of an exponent is represented with four (4) bits, Table 1 illustrates the values of the comparative value C.

TABLE 1

| | | | | | | | | | R | | | | | | | |
|---|---|---|---|---|---|---|---|---|---|---|---|---|---|---|---|---|
| P | 0 | 1 | 2 | 3 | 4 | 5 | 6 | 7 | 8 | 9 | 10 | 11 | 12 | 13 | 14 | 15 |
| 0 | 0 | 1 | 2 | 3 | 4 | 5 | 6 | 7 | 8 | 9 | 10 | 11 | 12 | 13 | 14 | 15 |
| 1 | 1 | 0 | 2 | 3 | 4 | 5 | 6 | 7 | 8 | 9 | 10 | 11 | 12 | 13 | 14 | 15 |
| 2 | 3 | 1 | 0 | 2 | 4 | 5 | 6 | 7 | 8 | 9 | 10 | 11 | 12 | 13 | 14 | 15 |
| 3 | 5 | 3 | 1 | 0 | 2 | 4 | 6 | 7 | 8 | 9 | 10 | 11 | 12 | 13 | 14 | 15 |
| 4 | 7 | 5 | 3 | 1 | 0 | 2 | 4 | 6 | 8 | 9 | 10 | 11 | 12 | 13 | 14 | 15 |
| 5 | 9 | 7 | 5 | 3 | 1 | 0 | 2 | 4 | 6 | 8 | 10 | 11 | 12 | 13 | 14 | 15 |
| 6 | 11 | 9 | 7 | 5 | 3 | 1 | 0 | 2 | 4 | 6 | 8 | 10 | 12 | 13 | 14 | 15 |
| 7 | 13 | 11 | 9 | 7 | 5 | 3 | 1 | 0 | 2 | 4 | 6 | 8 | 10 | 12 | 14 | 15 |
| 8 | 15 | 14 | 12 | 10 | 8 | 6 | 4 | 2 | 0 | 1 | 3 | 5 | 7 | 9 | 11 | 13 |
| 9 | 15 | 14 | 13 | 12 | 10 | 8 | 6 | 4 | 2 | 0 | 1 | 3 | 5 | 7 | 9 | 11 |
| 10 | 15 | 14 | 13 | 12 | 11 | 10 | 8 | 6 | 4 | 2 | 0 | 1 | 3 | 5 | 7 | 9 |
| 11 | 15 | 14 | 13 | 12 | 11 | 10 | 9 | 8 | 6 | 4 | 2 | 0 | 1 | 3 | 5 | 7 |
| 12 | 15 | 14 | 13 | 12 | 11 | 10 | 9 | 8 | 7 | 6 | 4 | 2 | 0 | 1 | 3 | 5 |
| 13 | 15 | 14 | 13 | 12 | 11 | 10 | 9 | 8 | 7 | 6 | 5 | 4 | 2 | 0 | 1 | 3 |
| 14 | 15 | 14 | 13 | 12 | 11 | 10 | 9 | 8 | 7 | 6 | 5 | 4 | 3 | 2 | 0 | 1 |
| 15 | 15 | 14 | 13 | 12 | 11 | 10 | 9 | 8 | 7 | 6 | 5 | 4 | 3 | 2 | 1 | 0 |

For example, Table 1 shows that if P is six (6) and R is four (4), the resultant comparative value would be three (3).

However, if P is six (6) and R is four (6), the resultant comparative value would be zero (0).

In act 250 the value of the mantissa may be predicted. The mantissa value may be predicted using any technique. In an embodiment where the data set represents values having localized similarity of data, the value of the mantissa may be predicted using neighboring values. Further, as pixels having similar values typically will have similar magnitudes, the exponent values of neighboring pixels may be used to determine which neighboring pixels represent a similar depth value and as such provide good predicting data for a particular pixel. In an embodiment, neighboring or adjacent pixels of a particular pixel having a similar exponent value are identified, and the mantissa values of the pixels having a similar exponent are used to determine the mantissa value of the particular point. For example, the mantissa values of neighboring pixels having a similar exponent may be averaged to provide the mantissa value for the particular pixel. A similar exponent may be an exponent within a determined range of the exponent value of the particular point. In an embodiment, pixels having an exponent value within one (1) of the exponent value of the particular pixel are considered similar. Further, the actual mantissa values of the neighboring pixels with similar exponents may be normalize such that the exponents may be the same as the exponent of the particular pixel to predict a value for the mantissa of the particular point.

Once a predicted mantissa value is determined, a comparative value between the actual value of a mantissa and the predicted value of the mantissa may be determined in act 252. Similar techniques as described above with respect to act 242 may be used to determine the comparative value for the mantissa. For example, an absolute difference or other techniques may be used.

In act 260 the determined comparative values are encoded. In an embodiment, both a comparative value for a mantissa and an exponent are encoded. Any encoding technique may be used. Encoding techniques which reduce the amount of data as numbers being encoded approach zero (0) are used. In an embodiment, arithmetic encoding techniques may be used. For example, a comparative value may be processed by an arithmetic encoder with appropriate arithmetic coder context that has alphabet size $2^N$ where N is number of bits used to represent original values.

In an embodiment for large values of N, such as 64 bit or 128 bit values, a comparative value may be subdivided into multiple code words. One embodiment involving multiple code words is to write the number of significant bits of the comparative value followed by the values of significant bits excluding the single most significant bit. This technique may result in a discrimination of values that were predicted with the same absolute value of error but different sign. The technique assures that errors of prediction of the same magnitude end up in the same group with the same code length. For example, a technique involves encoding the comparative value C with 2 code words, a Prefix and Suffix, which are computed as follows.

```
Input: C
Output: Prefix, Suffix
if C = 0 then
    let Prefix := 0
    let Suffix := 0 (no suffix is to be written)
else
    // here bitcount( ) stands for computation of number
    of significant bits of the number
```

-continued

```
// and & stands for bitwise and operation
let b = bitcount(C - 1);
if b < 2 then
    let Prefix := 1
    let Suffix := C & 1
else
    let Prefix := b
    let Suffix := C & (2^(Prefix-1) - 1)
endif
endif
``` where the Prefix value is stored as the value from alphabet with N+1 symbols. For the Suffix values, different arithmetic coder contexts are used with alphabet sizes dependent on the Prefix as follows:

$$\text{Suffix} \begin{cases} 0, & \text{Prefix} = 0 \\ 2, & \text{Prefix} = 1 \\ 2^{\text{Prefix}-1}, & 2 \leq \text{Prefix} \leq N - 1 \\ 2^{\text{Prefix}-1} - 1, & \text{Prefix} = N \end{cases}$$

In act 270 the encoded comparative values are transmitted. The encoded comparative values may be transmitted or otherwise communicated using any technique. In an embodiment, the encoded comparative values may be transmitted from the server 125 to a mobile device 122 via the network 127 of FIG. 4. In an embodiment, multiple encoded comparative values are transmitted sequentially in an established order.

In act 280, encoded comparative values may be decoded. The encoded comparative values may be decoded using any technique operable to recover the comparative values from the encoded values. The encoded values may be received by a separate device, such as a mobile device, from the transmission of act 270. The encoded values may be structured in a known or determined order such that the by the receipt of the encoded values the association of encoded values of particular pixels in known by the receipt order.

In act 280, the actual values are determined from the comparative values. The actual values may be determined from the comparative values using any technique. As the predicted value may be determined from data of the data set as indicated above, both the predicted value and the comparative value are known. The predicted value and the comparative value may then be used to determine the actual value. In an embodiment, the actual values are determined using a technique that is inverse to the technique used to determine the comparative value from the predicted value and the actual value. For example, determining the actual value R from a predicted value P and a decoded comparative value C may be computed as follows:

```
Input: P and C integer numbers in range [0, 2^N - 1]
Output: R integer number in range [0, 2^N - 1]
let M := 2^N - 1
if P < 2^(N-1) then
    let p := P
else
    let p := M - P
endif
if C > p then
    let r := C
else if C is odd number then
    let r := p-(C +1)/2
```

```
        else
            let r := p+ C / 2
        endif
        if P < 2^{N-1} then
            let R := r
        else
            let R := M - r
        endif
```

When actual values are recovered, the data set may be reassembled with the actual values in the order determined by the transmission. As such, the depth map for an image may be reconstructed.

In an embodiment, a device may perform acts 220, 230, 238, 240, 242, 250, 252, 260, and 270, and a separate device may perform acts 280 and 290 as well as reassembling the depth map and displaying an image to a user that is enhanced with the depth map.

FIGS. 3A-3D illustrate an embodiment of predictive value data set compression of a depth map 306 for an image 302 of a geographical area 301. FIG. 3A shows a geographic area 301 having an object 310 located a distance (e.g., 10 feet) from a camera 312 and an object 350 located a greater distance (e.g., 50 feet) from the camera 312. FIG. 3B shows an image 302 of the geographic area 302 that includes the two objects 310, 350. In FIG. 3C the pixels 361, 365, 367, 368, 369 neighboring and adjacent to a particular pixel 366 are shown with positions indexed from 1-3 on two perpendicular axis. FIG. 3D illustrates the enhanced information 370 of the image 302 relating to the neighboring pixels 361, 365, 367, 368, 369 and the particular pixel. This may be because these particular locations in the image represent a sky or horizon for the geographic area 301. The enhanced information may be used to create a depth map 306 relating to the depth values for the pixels of the image 302. The depth map may involve an indicator of the availability of depth data 315, an actual exponent value 316, and an actual mantissa value 317. Predicted values 307 for the particular pixel 366 may be determined using the neighboring pixels. Specifically, the exponent value for the particular point 366 may be predicted as the average exponent value of the neighboring pixels having depth data 365, 367, 368, 369. In this case, the average provides a fractional value. In this embodiment, fractional values may be rounded to the nearest whole number (4). The predicted value for the mantissa may be determined as the average mantissa value of neighboring pixels having a similar exponent 367, 368, 369. Comparative values 308 for the particular pixel 366 may be determined from the predicted values 307 and the actual values 309 for the particular pixel 366, for example as is described above with respect to FIG. 2.

The comparative values 308 for the particular pixel 366 may be encoded. Also, as can be seen from FIGS. 3A-3D, the information for the particular pixel 366 which may have been originally stored using 33 bits, may be stored using three (3) bits. As such, less data may require encoding, and even less data may be transmitted, yet the same information is communicated.

For example, an actual bit sent to arithmetic encoder may be computed using Equation 1.

$$\text{code} = R_0 \oplus P_0 \qquad \text{Equation 1:}$$

where $R_0$ is actual value zero or one corresponding to the actual presence of the depth-map value, and $P_0$ is the predicted value, $\oplus$ represents the exclusive OR. Further, a decoder may be able to generate the same predictor based on previously decoded neighboring pixels of the particular pixel and compute the actual value $R_0$ using Equation 2.

$$R_0 = \text{code} \oplus P_0 \qquad \text{Equation 2:}$$

Note that if a predictor $P_0$ matches the actual value $R_0$ then the resulting code value becomes zero. Therefore, a better predictor will yield higher probability of zeroes, and lower probability of ones, which results in compression gain through the encoding process.

In an embodiment, a compressor or encoder utilizes an arithmetic coding algorithm to compress information for each point of a depth map. The writing of data with the compressor is done through Equation 3.

$$ac.\text{encode}(\text{unsigned code}, ac\_\text{context\& context}) \qquad \text{Equation 3:}$$

where ac is an instance of the compressor, and context is an instance of ac_context that defines the alphabet (represented as range of unsigned integers starting from 0) and provides the probabilities for each symbol of the alphabet.

Similarly decoding is performed using Equation 4 to read data previously saved by the compressor.

$$\text{unsigned } ac.\text{decode}(ac\_\text{context\& context}) \qquad \text{Equation 4:}$$

Figure 4:
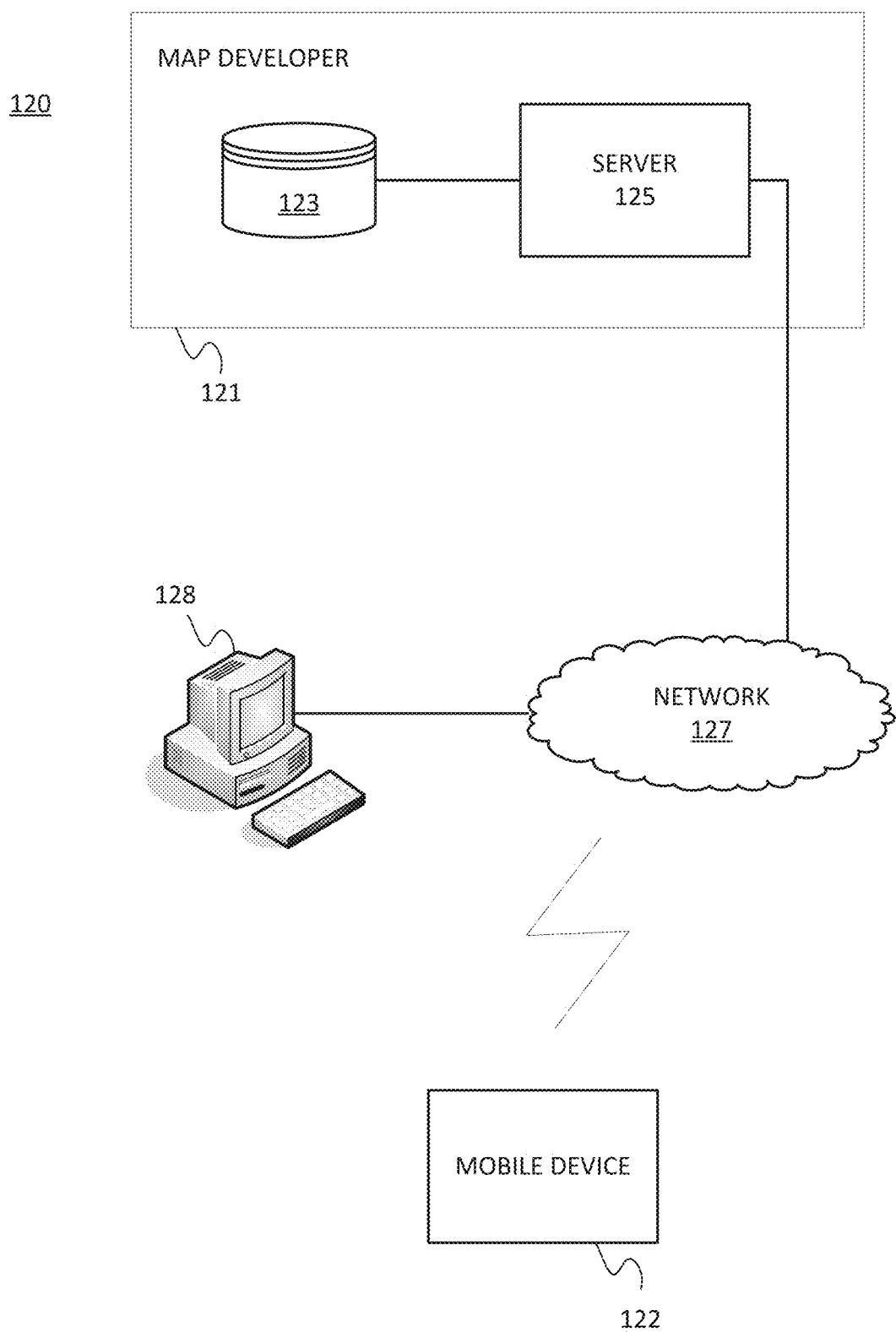
FIG. 4 illustrates an exemplary system for compression, transmission, reception, and decompression of data sets.

FIG. 4 illustrates an exemplary system 120. The system 120 may include includes a developer system 121, a mobile device 122, and a network 127. Additional, different, or fewer components may be provided. For example, many mobile devices 122 may connect with the network 127.

The developer system 121 includes a server 125 and a database 123. The developer system 121 may include computer systems and networks of a system operator such as NAVTEQ or NOKIA Corporation. The geographic database 123 may be partially or completely stored in the mobile device 122.

The developer system 121 and the mobile device 122 are coupled with the network 127. The phrase "coupled with" is defined to mean directly connected to or indirectly connected through one or more intermediate components. Such intermediate components may include hardware and/or software-based components.

The database 123 includes geographic data used for traffic, navigation, and/or enhanced imaging related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may also include images of geographic areas having associated value data sets such as depth maps.

The mobile device 122 may include one or more detectors or sensors as a positioning system built or embedded into or within the interior of the mobile device 122. Alternatively, the mobile device 122 uses communications signals for position determination. The mobile device 122 receives location data from the positioning system. The server 125 may receive sensor data configured to describe a position of a mobile device, or a controller of the mobile device 122 may receive the sensor data from the positioning system of the mobile device 122. The mobile device 122 may also include a system for tracking mobile device movement, such as rotation, velocity, or acceleration. Movement information may also be determined using the positioning system. The mobile device 122 may use the detectors and sensors to provide data that may be used to further interact with images of geographic areas.

The mobile device 122 may communicate location and movement information via the network 127 to the server 125. The server 125 may use the location and movement information received from the mobile device 122 to associate the mobile device 122 with a geographic region, or a road of a geographic region, described in the geographic database 123. Server 125 may also associate the mobile device 122 with a geographic region, or a road of a geographic region, manually.

The server 125 may receive location and movement information from multiple mobile devices 122 over the network 127. The location and movement information may be in the form of mobile device data. The server 124 may compare the mobile device data with data of a road system stored in the database 123.

The computing resources for predictive value data set compression may be divided between the server 125 and the mobile device 122. In some embodiments, the server 125 performs a majority of the processing. In other embodiments, the mobile device 122 performs a majority of the processing. In addition, the processing is divided substantially evenly between the server 125 and the mobile device 122.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

Figure 5:
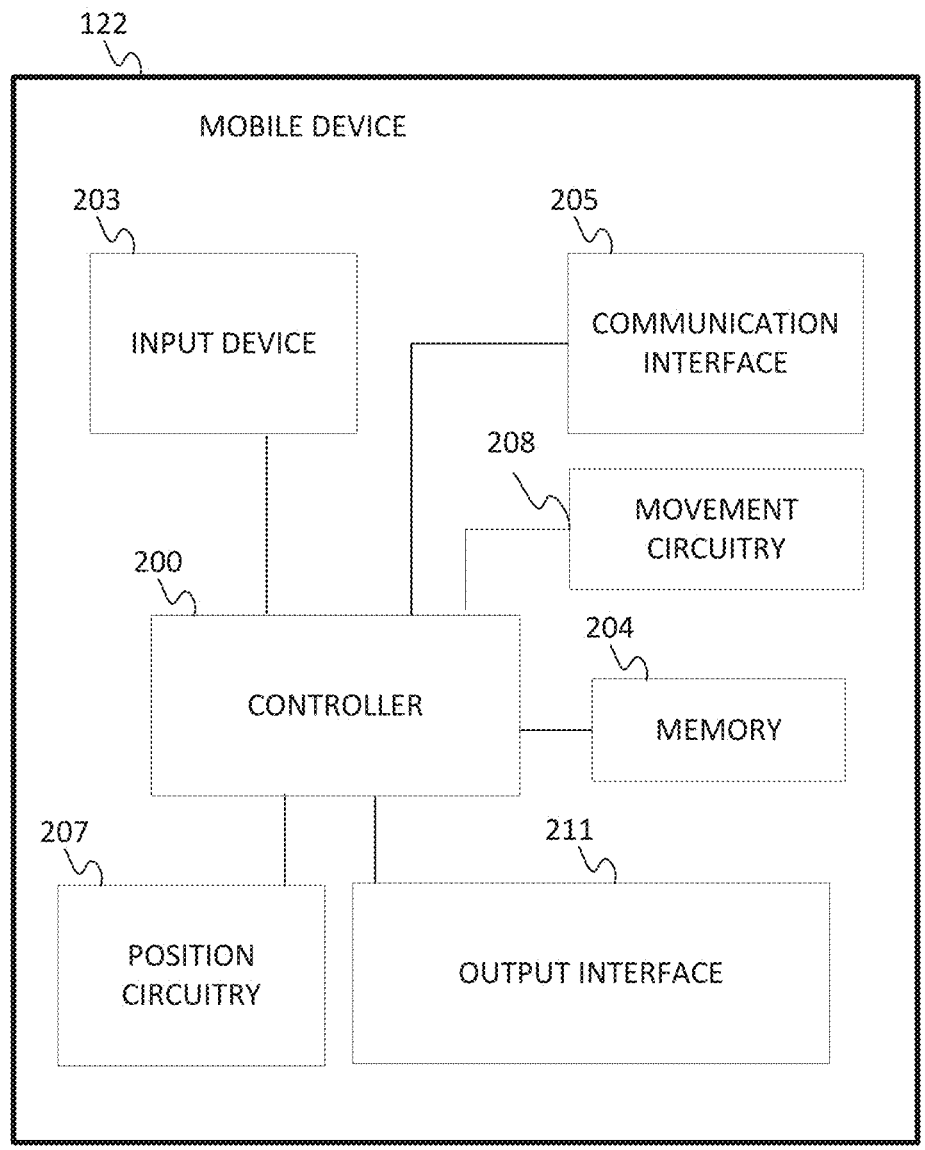
FIG. 5 illustrates an exemplary mobile device of the system of FIG. 4.

FIG. 5 illustrates an exemplary mobile device of the system of FIG. 4. The mobile device 122 includes a controller 200, a memory 204, an input device 203, a communication interface 205, position circuitry 207, movement circuitry 208, and an output interface 211. The output interface 211 may present visual or non-visual information such as audio information. Additional, different, or fewer components are possible for the mobile device 122. The mobile device 122 is a smart phone, a mobile phone, a personal digital assistant (PDA), a tablet computer, a notebook computer, a personal navigation device (PND), a portable navigation device, and/or any other known or later developed mobile device. The positioning circuitry 207, which is an example of a positioning system, is configured to determine a geographic position of the mobile device 122. The movement circuitry 208, which is an example a movement tracking system, is configured to determine movement of a mobile device 122. The position circuitry 207 and the movement circuitry 208 may be separate systems, or segments of the same positioning or movement circuitry system. In an embodiment, components as described herein with respect to the mobile device 122 may be implemented as a static device.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The movement circuitry 208 may include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device. The movement circuitry 208 may be used alone, or with the positioning circuitry 207 to determine mobile device 122 movement.

Positioning and movement data obtained from a mobile device may be considered geographic data, device data, and/or mobile device data.

The input device 203 may be one or more buttons, keypad, keyboard, mouse, stylus pen, trackball, rocker switch, touch pad, voice recognition circuit, or other device or component for inputting data to the mobile device 122. The input device 203 and the output interface 211 may be combined as a touch screen, which may be capacitive or resistive. The output interface 211 may be a liquid crystal display (LCD) panel, light emitting diode (LED) screen, thin film transistor screen, or another type of display. The output interface 211 may also include audio capabilities, or speakers. In an embodiment, the output interface 211 is operational to display an image of a geographic area. The image may be correlated to the current location of the mobile device using position circuitry 207.

The communication interface 205 is configured to send mobile device movement and position data to a server 125. The position circuitry 207 is configured to determine the current location of the mobile device.

In an embodiment, the communication interface 205 may be configured to receive encoded comparators of depth values for an image of a geographic area. The controller 200 may be configured to cause the mobile device 122 to decode the received encoded comparators, determine predicted values for the pixels of the image, and determine an actual value using the predicted values and the decoded comparators.

Figure 6:
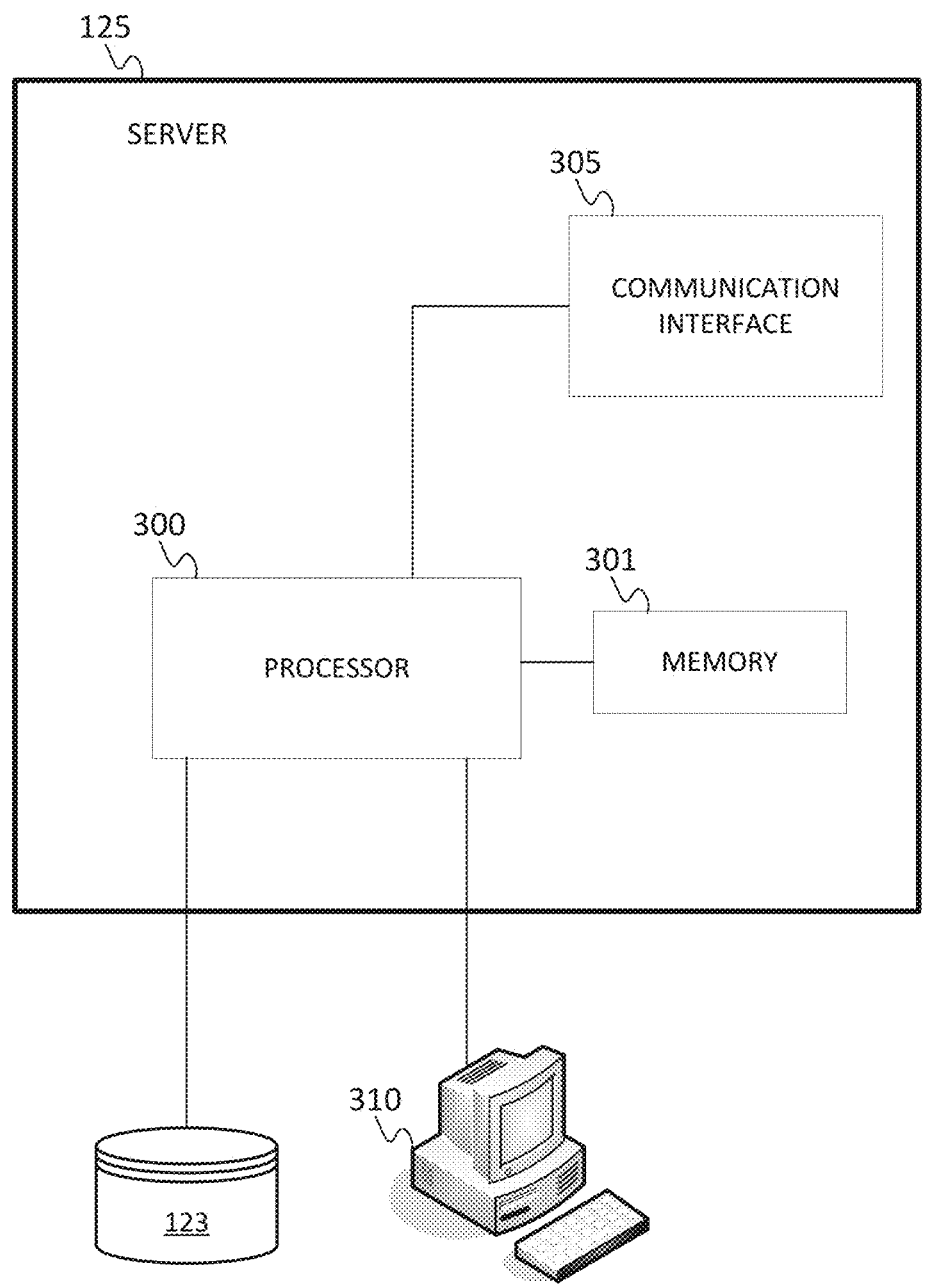
FIG. 6 illustrates an exemplary server of the system of FIG. 4.

FIG. 6 illustrates an exemplary server of the geographic or navigation system of FIG. 4. The server 125 includes a processor 300, a communication interface 305, and a memory 301. The server 125 may be coupled to a database 123 and a workstation 310. The database 123 may be a geographic database. The workstation 310 may be used as an input device for the server 125. In addition, the communication interface 305 is an input device for the server 125.

The communication interface 305 may receive data indicative of inputs made via the mobile device 122.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 100, such as a secure digital (SD) memory card.

In an embodiment the processor 300 may be coupled to the memory 204 operable to store a data set involving depth values for a plurality of pixels. The memory 204 also contains program code configured to be executed by the processor 300 to cause the server 125 to predict a depth value for a particular point of the image based on depth values of neighboring points, determine a comparator between the predicted depth value and an actual depth value for the particular point, and encode the comparator for the particular point.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

In an embodiment, the communication interface 305 is operable to transmit encoded values corresponding to comparative values between actual depth data for a pixel and predicted depth data for a pixel.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In an embodiment, the set of instructions may be configured to be executed by the processor 300 to cause the server 125 to identify a data set comprising values associated with individual pixels of a plurality of pixels in an image. The instructions may be further configured to be executed by the processor 300 to cause the server 125 to predict a value for a particular point of the image based on values of neighboring points. The instructions may be further configured to be executed by the processor 300 to cause the server 125 to determine a comparator between the predicted value and an actual value for the particular point, and encode the comparator for the particular point.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   identifying an image of a geographic area, the image including objects located in the geographic area;
   identifying a data set collected by a distance ranging device, the data set comprising depth values correlated to a plurality of points in the image of the geographic area;
   predicting, by a processor, a depth value for a particular point of the image based on depth values of neighboring points;
   determining a comparative value between the predicted depth value and an actual depth value for the particular point;
   encoding the comparative value as a depth value of the image of the geographic area, and
   displaying the image of the geographic area encoded with the comparative value,
   wherein the depth values for the plurality of points are represented as floating point numbers,
   wherein predicting the depth value comprises predicting a value for an exponent and predicting a value for a mantissa,
   wherein the comparative value comprises a comparative value determined between an actual exponent and the predicted exponent and a comparative value determined between an actual mantissa and the predicted mantissa of the particular point.

2. The method of claim 1, wherein predicting a value for the mantissa is based on mantissa values of neighboring points having an exponent value within a range of an exponent value of the particular point.

3. The method of claim 2, wherein the neighboring points having a similar exponent value are neighboring points having an exponent value within one (1) of the exponent value of the particular point.

4. The method of claim 1, wherein the predictive value for the exponent of the particular point is an average of exponent values of neighboring points.

5. The method of claim 1, wherein comparative values are determined and encoded for the plurality of points of the image.

6. The method of claim 5, wherein the data set further comprises an indicator as to an existence of depth data for the plurality of points, and wherein comparative values are only determined for points of the plurality of points when the indicator indicates that points have depth data.

7. The method of claim 1, further comprising:
   transmitting the encoded comparative value to a mobile device.

8. The method of claim 1, wherein neighboring points are points adjacent to the particular point.

9. The method of claim 1, wherein the particular point of the image includes a pixel that depicts an object in the geographic area and the particular point includes no correlated value from the depth data set.

10. The method of claim 9, wherein the depth value for the particular point corresponds to a distance from the object to the distance ranging device.

11. An apparatus comprising:
    at least one processor; and
    at least one memory including computer program code and operable to store a data set comprising values for a plurality of pixels in an image, the values relating to relative distances of objects represented in the image;
    the at least one memory and the computer program code configured to, with the at least one processor, cause the apparatus at least to:
    identify an image of a geographic area, the image including objects located in the geographic area;
    identify a depth data set collected by a distance ranging device, the depth data set comprising depth values correlated to pixels in the image of the geographic area;
    calculate a predicted value for a particular point of the image based on values of neighboring points;
    determine a comparator between the predicted value and an actual value for the particular point; and
    display the image of the geographic area enhanced with the comparator,
    wherein the values for the plurality of pixels are represented as floating point numbers, and wherein the predicted value comprises a predicted value for an exponent and a predicted a value for a mantissa, and
    wherein the comparator comprises a comparative value determined between an actual exponent and the predicted exponent and a comparative value determined between an actual mantissa and the predicted mantissa of the particular point.

12. The apparatus of claim 11, wherein a value for the mantissa is predicted based on mantissa values of neighboring points having an exponent value within one (1) of an exponent value of the particular point.

13. The apparatus of claim 11, wherein the at least one memory and the computer program code are further configured to, with the at least one processor, cause the apparatus at least to:
transmit the encoded comparator to another apparatus.

14. A non-transitory computer readable medium including instructions that when executed on a computer are operable to:
identify an image of a geographic area, the image including objects located in the geographic area;
identify a data set comprising depth values associated with individual pixels of a plurality of pixels in the image of the geographic area;
calculate a predicted value for a particular pixel of the image based on values of neighboring pixels,
wherein the values for the plurality of pixels are represented as floating point numbers, and wherein the predicted value comprises a predicted value for an exponent and a predicted a value for a mantissa;
determine a comparator between the predicted value and an actual value for the particular pixel;
encode the comparator for the particular pixel; and
display the image of the geographic area enhanced with the comparator,
wherein the comparator comprises a comparative value determined between an actual exponent and the predicted exponent and a comparative value determined between an actual mantissa and the predicted mantissa of the particular pixel.

* * * * *